Oct. 2, 1951      J. W. LENNON      2,569,681
EGG CARTON
Filed Feb. 21, 1947
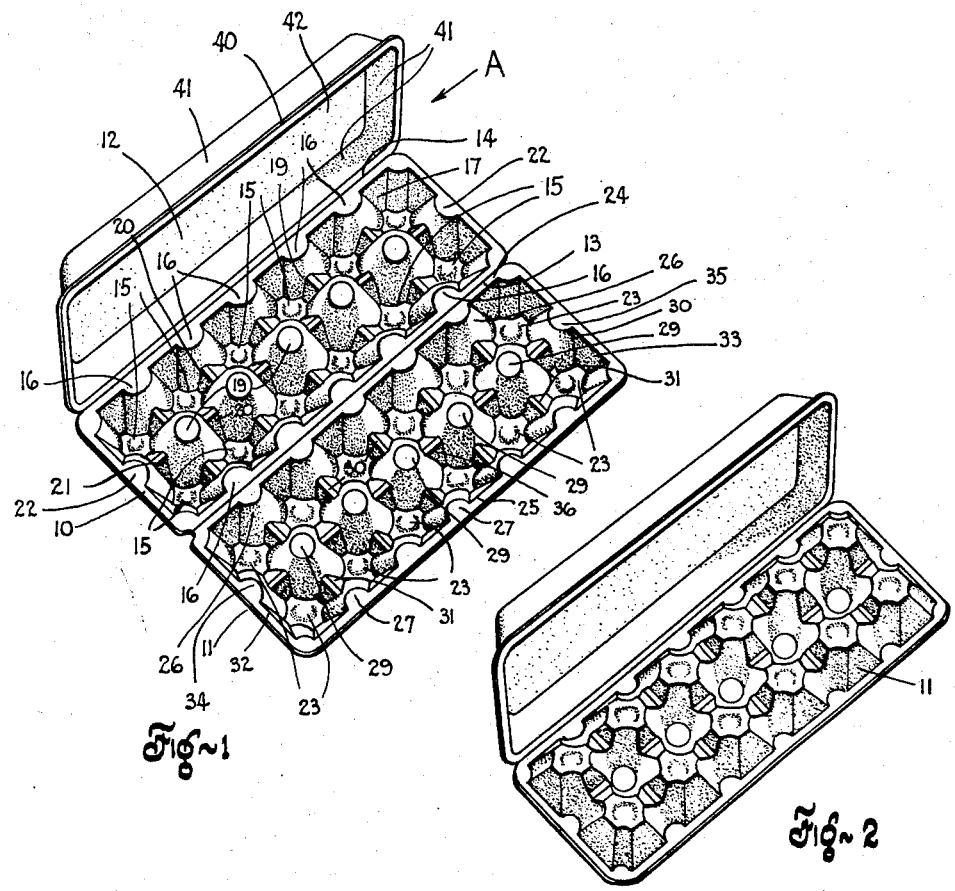
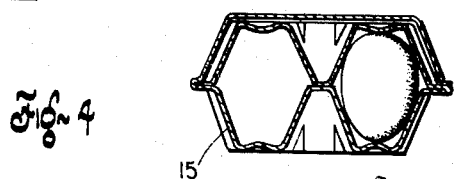
Inventor
James Warren Lennon
By Robert M. Dunning
Attorney Patented Oct. 2, 1951

2,569,681

UNITED STATES PATENT OFFICE 2,569,681

EGG CARTON

James Warren Lennon, St. Paul, Minn., assignor, by mesne assignments, to Shellmar Products Corporation, Chicago, Ill., a corporation of Delaware Application February 21, 1947, Serial No. 729,963

5 Claims. (Cl. 229—2.5)

My invention relates to an improvement in egg cartons wherein it is desired to provide a carton construction capable of accommodating eggs of various sizes.

Egg cartons have previously been constucted of molded pulp or the like which contain or include opposed sections, both having egg receiving recesses therein. The two sections of the carton fold one upon the other to enclose an egg therebetween. In the past it has been common practice to form the egg receiving recesses of both sections the same shape and size. This is disadvantageous because the eggs are usually not similarly shaped on both ends, one end of the egg usually being of larger diameter than the other. As a result if one carton section properly accommodates one end of the egg, the other carton section will loosely fit the smaller end of the egg.

The object of the present invention is to provide an egg carton formed of molded pulp or similar material which includes two complementary sections having egg receiving recesses therein and in forming one of these sections with apertures of smaller size than the other. The section having the larger sized apertures is designed to accommodate the larger diameter end of each egg, while the section having the smaller sized apertures is designed to accommodate the smaller diameter end of the egg. As a result the egg is more firmly supported at both ends and is not free to pivot or move longitudinally between the two sections.

I have found that much of the injury to eggs is caused by supporting the egg in such a manner that the egg may move within its support. If the egg is free to move it will do so during the handling of the carton. As a result the shell of the egg is subjected to relatively sharp and sudden impacts as the egg moves against a supporting wall. Breakage of the shell is often caused by such an impact.

An added feature of the present invention lies in the provision of an egg carton which will more effectively support the egg from movement relative to the walls of the carton. As a result the smaller end of the egg is engaged as firmly as the larger end thereof, thus holding the egg from tilting or from movement. As the carton is formed of material capable of absorbing shocks and impacts the breakage of the eggs is decreased by this construction.

These and other objects and novel features of my invention will be more clearly and fully set forth in the following specification and claims.

In the drawings forming a part of my specification:

Figure 1 is a perspective view of an egg carton in open position.

Figure 2 is a perspective view of my carton in partially closed position.

Figure 3 is a side elevational view of my carton in closed position.

Figure 4 is a sectional view through the closed carton showing an egg in position therein.

The carton A illustrated in the drawings preferably includes a base section 10, an enclosing section 11, and a cover section 12. The base section 10 is preferably foldably connected to the enclosing section 11 along a fold line 13, while the cover section is preferably hinged to the opposite side of the base section along a parallel fold line 14. The three section egg carton has been described in a previous application and no claim is made to this arrangement other than in conjunction with the terms of the base and enclosing sections.

The base section 10 includes a series of spaced egg receiving recesses 15, these recesses being arranged in parallel rows in preferred form with six eggs in each row. The recesses in each row are separated by inwardly projecting spacers 16 which extend toward the interior of the carton from the opposite inclined walls 17 of the recesses. Center posts 19 form spacing means between the eggs of the two rows as well as between the eggs of each elongated row. Partition walls 20 connect each inwardly extending projection with a corresponding center post 19 and similar longitudinally extending partition walls 21 extend between each adjacent pair of center posts 19 and also between these center posts and opposed inwardly extending projections 22 at opposite ends of the section.

In other words, the eggs are supported in egg receiving recesses 15 which are bounded by inclined outer walls of the section, by center posts, and by partition walls connecting the center posts to each other and to the side walls.

The section 11 of the carton A is similar in general to the section 10 previously described. The section 11, however, is provided with egg receiving recesses 23 which are of larger size than the similar recesses 15 of the section 10. The recesses 23 are made larger by reducing the size of the inwardly extending projections on the side and end walls and also in reducing the size of the center posts.

The section 10 includes downwardly inclined side walls 24 and 25 which define opposite sides of the egg receiving recesses. The inclined wall 24 is separated into sections by inwardly extending integral projections 26 similar to the projections 16 of the section 10, but somewhat smaller in size. The inwardly inclined wall 25 is similarly provided with inwardly extending projections 27 which are integral with the wall and divide the same into sections. Center posts 29 extend upwardly from the lower extremity of the section 11, these center posts 29 being similar to the center posts 19, but somewhat smaller in size. The center posts 19 are connected to opposed projections 26 and 27 by partition walls 30 and 31, respectively. At opposite ends of the section 11 inwardly inclined end walls 32 and 33 are provided. These end walls are centrally divided by inwardly extending projections 34 and 35 respectively. Aligned partition walls 36 extend between adjacent center posts and between the last center posts of the series and the projections 35. Thus the section 11 of the carton is provided with a series of egg receiving recesses 23 which are somewhat larger than the egg receiving recesses 15 of the section 10. Each recess is separated from the next adjacent recess by the inwardly extending projections on the side walls and end walls, by the center posts and by the various partition walls connected to the center posts.

The cover section 12 comprises merely a tray shaped element having a peripheral flange 40 which is connected by inclined side walls 41 to a top panel 42. The hollow enclosing cover thus formed fits over the section 11 in folded condition of the carton protecting the eggs and forming an additional cushion which allows numerous cartons to be superimposed one upon the other.

As best illustrated in Figure 4 of the drawings the eggs are inserted into the base section 10 of the carton with the pointed or smaller diameter end of the egg directed downwardly and with the larger diameter end of the egg projecting upwardly. When the section 11 is folded over the eggs the egg receiving apertures are of somewhat larger size than the recesses 15 of the base section 10, thereby fitting snugly about the larger ends of the eggs.

From the foregoing description it will be obvious that if the apertures of both sections 10 and 11 are similar in size as is usual practice, the apertures in the base section must be of sufficient size to enclose the large diameter end of the egg. During shipment it is extremely desirable that the eggs be arranged with the small diameter end lowermost. Therefore when the eggs were packed in the recesses sufficiently large to enclose the large diameter end of the egg, the pointed ends of the egg usually rested upon the lower ends of the egg receiving recesses so that the eggs rested directly upon the bottom of the carton. Because of the fact that the apertures of both sections were of similar size the lower pointed end of the egg was not supported as effectively as the large diameter end. Not only was it often possible for the eggs to move vertically when thus encased, but also the eggs were often permitted to tilt because of the spacing between the projections and the small diameter end of the egg.

In the present construction the pockets of the base section are of smaller size so that the inclined projections and the walls of the carton leading to the base of the pockets are closer together and as a result the egg engages against these inclined projections and is firmly held from tilting. Furthermore the egg wedges between the inclined projections and the entire weight of the egg is not upon the pointed end thereof. By distributing the weight of the egg to several points on the surface of the egg, much of the breakage to the eggs contained is obviated.

In accordance with the patent statutes, I have described the principles of construction and operation of my egg carton, and while I have endeavored to set forth the best embodiment thereof, I desire to have it understood that obvious changes may be made within the scope of the following claims without departing from the spirit of my invention.

I claim:

1. An egg carton including a pair of elongated sections of molded pulp hingedly connected together to fold from side-by-side relation to superposed relation, each of said sections comprising a tray-shaped body having a bottom and rectangularly arranged side and end walls connected thereto, a series of spaced tapered integral posts extending upwardly from the bottom to the plane of the marginal edges of the side and end walls, a series of tapered integral inward projections on said side walls in transverse alignment with said posts, a series of tapered integral projections on said end walls in longitudinal alignment with said posts, said bottom, side and end walls, said posts and said inward projections combining to form egg receiving pockets capable of supporting eggs in spaced relation, the posts and inward projections of the two sections being in opposed relation in superposed position of the sections, the posts of one section extending into substantial contact with the posts of the other section when the sections are in superposed relation, the posts and inward projections of one section being larger than the similar elements of the other section, thereby providing smaller pockets in said one section.

2. The structure defined in claim 1 and including a tray-shaped cover hingedly connected to one of said sections and foldable over the uppermost of said sections in superposed relation thereof.

3. The structure defined in claim 1 and including an inward bulge in the bottom of each section at the base of each pocket, the bulges in said one section being smaller than the bulges in the other section.

4. A molded pulp carton comprising a pair of generally similar sections each subdivided into rows of separated egg receiving recesses by integral transverse and longitudinal divider formations which extend continuously from side to side and end to end thereof, respectively, the formations of said respective sections each including a like number of integral vertical projections which are spaced relative to one another to have lateral supporting engagement with eggs in said recesses, and which are in vertical alignment with one another, respectively, when the sections are in closed condition, the posts of one section being larger in cross sectional area than those of the other, thereby providing smaller recesses in said one section, said sections being free of outward projections in the recess defining areas thereof bounded by said divider formations.

5. A molded pulp carton comprising a pair of generally similar, integrally hinged sections each subdivided into rows of separated egg receiving recesses by integral transverse and longitudinal divider formations which extend continuously from side to side and end to end thereof, respectively, the formations of said respective sections each including a like number of integral vertical projections which are spaced relative to one another to have lateral supporting engagement with eggs in said recesses, and which are in vertical alignment with and abut one another, respectively, when the sections are in closed condition, the posts of one section being larger in cross sectional area than those of the other, thereby providing smaller recesses in said one section, said sections being free of outward projections in the recess defining areas thereof bounded by said divider formations, and a non-cellular cover section integrally hinged to one of the said first named sections.

JAMES WARREN LENNON.

REFERENCES CITED

The following references are of record in the file of this patent:

UNITED STATES PATENTS

| Number | Name | Date |
|---|---|---|
| 931,637 | Odell | Aug. 17, 1909 |
| 1,543,443 | Koppelman | June 23, 1925 |
| 1,843,543 | De Reamer | Feb. 2, 1932 |
| 1,846,561 | Koppelman | Feb. 23, 1932 |
| 1,975,129 | Sherman | Oct. 2, 1934 |
| 2,285,129 | Schwartzberg | June 2, 1942 |
| 2,446,264 | Cox | Aug. 3, 1948 |